(12) United States Patent
Nishimura et al.

(10) Patent No.: US 11,663,184 B2
(45) Date of Patent: May 30, 2023

(54) INFORMATION PROCESSING METHOD OF GROUPING DATA, INFORMATION PROCESSING SYSTEM FOR GROUPING DATA, AND NON-TRANSITORY COMPUTER READABLE STORAGE MEDIUM

(71) Applicant: NEC CORPORATION, Tokyo (JP)

(72) Inventors: Shoji Nishimura, Tokyo (JP); Jianquan Liu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 176 days.

(21) Appl. No.: 16/628,832

(22) PCT Filed: May 31, 2018

(86) PCT No.: PCT/JP2018/021027
§ 371 (c)(1),
(2) Date: Jan. 6, 2020

(87) PCT Pub. No.: WO2019/008961
PCT Pub. Date: Jan. 10, 2019

(65) Prior Publication Data
US 2020/0133930 A1    Apr. 30, 2020

(30) Foreign Application Priority Data

Jul. 7, 2017   (JP) .............................. JP2017-133677

(51) Int. Cl.
*G06F 16/20*     (2019.01)
*G06F 16/22*     (2019.01)
(Continued)

(52) U.S. Cl.
CPC ........ *G06F 16/2246* (2019.01); *G06F 16/215* (2019.01); *G06F 16/248* (2019.01);
(Continued)

(58) Field of Classification Search
CPC .. G06F 16/2246; G06F 16/285; G06F 16/215; G06F 16/282; G06F 16/24578; G06F 16/248
See application file for complete search history.

(56) References Cited

U.S. PATENT DOCUMENTS 7,796,821 B2 *   9/2010   Jafarkhani ........... G06K 9/6224
                                                         382/224
8,458,195 B1 *   6/2013   Procopio ............. G06F 16/9535
                                                         707/749
(Continued)

FOREIGN PATENT DOCUMENTS

JP        07-105239 A       4/1995
JP       2000-112988 A      4/2000
(Continued)

OTHER PUBLICATIONS

International Search Report for PCT/JP2018/021027 dated Aug. 28, 2018. [PCT/ISA/210].
(Continued)

*Primary Examiner* — Tarek Chbouki

(57) ABSTRACT

An information processing apparatus (100) includes an input unit (102) that inputs a first threshold value and a second threshold value which are threshold values related to a degree of similarity of a feature value of each of a plurality of pieces of data, the first threshold value being for regarding data as belonging to an identical group and the second threshold value being smaller than the first threshold value, and a grouping unit (104) that groups the data by using the degree of similarity, the first threshold value, and the second threshold value, in which the grouping unit (104) causes data of which the degree of similarity with representative data is greater than the first threshold value to be included in the same group, and selects new representative data from among pieces of data of which the degree of similarity with the
(Continued)

representative data already present is less than the second threshold value.

18 Claims, 11 Drawing Sheets

(51) Int. Cl.
 *G06F 16/28* (2019.01)
 *G06F 16/215* (2019.01)
 *G06F 16/2457* (2019.01)
 *G06F 16/248* (2019.01)
(52) U.S. Cl.
 CPC ...... *G06F 16/24578* (2019.01); *G06F 16/282* (2019.01); *G06F 16/285* (2019.01)

(56) References Cited

U.S. PATENT DOCUMENTS

| | | | | |
|---|---|---|---|---|
| 8,995,758 B1* | 3/2015 | Bissacco | ................ | G06Q 30/06 |
| | | | | 382/159 |
| 10,095,957 B2* | 10/2018 | Kulkarni | .............. | G06K 9/6215 |
| 2004/0019601 A1 | 1/2004 | Gates | | |
| 2004/0208365 A1* | 10/2004 | Loui | .................... | G06K 9/6218 |
| | | | | 382/171 |
| 2008/0152218 A1* | 6/2008 | Okada | ................. | G06K 9/6282 |
| | | | | 382/159 |
| 2008/0300055 A1* | 12/2008 | Lutnick | ................... | G07F 17/32 |
| | | | | 463/39 |
| 2009/0260016 A1* | 10/2009 | Ramakrishnan | ...... | G06F 9/5083 |
| | | | | 718/105 |
| 2011/0050723 A1* | 3/2011 | Tokunaga | ............... | G06T 11/00 |
| | | | | 345/627 |
| 2011/0170769 A1* | 7/2011 | Sakimura | ............... | G06K 9/623 |
| | | | | 382/159 |
| 2014/0149412 A1* | 5/2014 | Nakamura | ............ | G06F 16/355 |
| | | | | 707/737 |
| 2014/0254940 A1* | 9/2014 | Shiiyama | ............. | G06V 10/462 |
| | | | | 382/201 |
| 2014/0279757 A1* | 9/2014 | Shimanovsky | ....... | H04W 4/029 |
| | | | | 706/12 |
| 2015/0169645 A1* | 6/2015 | Li | ......................... | G06F 16/532 |
| | | | | 707/722 |
| 2016/0300372 A1* | 10/2016 | Molin | ........................ | G06T 7/60 |
| 2016/0321331 A1* | 11/2016 | Uchiumi | ............... | G06F 16/248 |
| 2017/0052958 A1* | 2/2017 | Manning | ........... | G06F 16/24578 |
| 2017/0364769 A1* | 12/2017 | Sandler | ............. | G06K 9/00281 |

FOREIGN PATENT DOCUMENTS

| | | |
|---|---|---|
| JP | 2007-058562 A | 3/2007 |
| JP | 2012-008836 A | 1/2012 |
| JP | 3178978 U | 9/2012 |
| JP | 2012-226740 A | 11/2012 |
| JP | 2015-184760 A | 10/2015 |
| WO | 2016/006090 A1 | 1/2016 |

OTHER PUBLICATIONS

Jianquan Liu et al., "Efficient Similarity Search Using Tree-Structured Index Based on Hierarchical Relationship in Similarity", The 5th forum on data engineering and information management(The 11th annual conference of the Database Society of Japan), Jun. 5, 2013, pp. 1 to 8.

* cited by examiner

INFORMATION PROCESSING METHOD OF GROUPING DATA, INFORMATION PROCESSING SYSTEM FOR GROUPING DATA, AND NON-TRANSITORY COMPUTER READABLE STORAGE MEDIUM

CROSS REFERENCE TO RELATED APPLICATIONS

This application is a National Stage of International Application No. PCT/JP2018/021027 filed May 31, 2018, claiming priority based on Japanese Patent Application No. 2017-133677, filed Jul. 7, 2017, the disclosures of which are incorporated herein in their entirety by reference.

TECHNICAL FIELD

The present invention relates to an information processing apparatus, an information processing method, and a program, and particularly to an information processing apparatus, an information processing method, and a program, capable of grouping data.

BACKGROUND ART

Data such as an image or a document is data evaluated on the basis of the degree of similarity of features of the data instead of whether or not pieces of the data completely match each other. In a case where such data is classified or summarized, an operation of gathering pieces of data having a predetermined degree of similarity or more together, that is, grouping based on resemblance is effective.

Patent Document 1 discloses an example of a retrieval system that realizes such grouping based on similarity. The system disclosed in Patent Document 1 is characterized to register data in a group in a case where the data exceeds a threshold value of similarity with representative data of the group when retrieval results are grouped on the basis of similarity.

In a database management method disclosed in Patent Document 2, a grouping database includes small databases. Data is stored in the small databases for each data-set having specific classification data. The grouping database is searched by using given retrieval conditions. The given retrieval conditions are sequentially stored in a retrieval result database. The small databases are rearranged to meet a retrieval condition having a high frequency among the given retrieval conditions.

Patent Document 3 discloses a method of efficiently grouping biological information accumulated in a database. An apparatus disclosed in Patent Document 3 first obtains the degree of similarity among all face images accumulated in the database on the basis of a feature value extracted from the accumulated face images. Face images having the degree of similarity greater than a first threshold value are grouped as a first group, and face images not included in the first group and having the degree of similarity among the face images greater than a second threshold value (<the first threshold value) are grouped as a second group. The first threshold value is set to a value in a range for securing that a false acceptance rate is zero, and the second threshold value is set to a value for securing a false rejection rate to some extent.

RELATED DOCUMENT

Patent Document

[Patent Document 1] Japanese Unexamined Patent Application No. 2000-112988
[Patent Document 2] Japanese Unexamined Patent Publication No. H07-105239
[Patent Document 3] Japanese Unexamined Patent Publication No. 2012-008836

SUMMARY OF THE INVENTION

Technical Problem

There are many cases that are not necessarily accurate, for example, a case where the degree of similarity between pieces of data that are grouping targets includes an error and therefore an algorithm for computing the degree of similarity does not return a value accurately reflecting the real world, or a case where there is a difference between a result of an algorithm and a result expected by a person. Thus, there is a problem in that a desired grouping result cannot be obtained.

The present invention has been made in light of the circumstances mentioned above, and an object thereof is to provide an information processing apparatus, an information processing method, and a program capable of performing data grouping with high accuracy.

Solution to Problem

In each aspect of the present invention, the following configuration is employed to solve the above-described problem.

A first aspect relates to an information processing apparatus.

An information processing apparatus related to the first aspect includes an input unit that inputs a first threshold value and a second threshold value which are threshold values related to a degree of similarity of a feature value of each of a plurality of pieces of data, the first threshold value being for regarding data as belonging to an identical group and the second threshold value being smaller than the first threshold value; and a grouping unit that groups the data by using the degree of similarity, the first threshold value, and the second threshold value, in which the grouping unit causes data of which the degree of similarity with representative data is greater than the first threshold value to be included in the same group, and selects new representative data from among pieces of data of which the degree of similarity with the representative data already present is less than the second threshold value.

A second aspect relates to an information processing method executed by at least one computer.

An information processing method, related to the second aspect, executed by an information processing apparatus, the method including:

inputting a first threshold value and a second threshold value which are threshold values related to a degree of similarity of a feature value of each of a plurality of pieces of data, the first threshold value for regarding as belonging to an identical group, and the second threshold value smaller than the first threshold value; and grouping the data by using the degree of similarity, the first threshold value, and the second threshold value, in which, the grouping including:

causing data of which the degree of similarity with representative data is greater than the first threshold value to be included in the same group, and selecting new representative data from among pieces of data of which the degree of similarity with the representative data already present is less than the second threshold value.

It should be noted that other aspects of the present invention may relate to a program causing at least one computer to execute the method of the second aspect, and may relate to a computer readable storage medium storing the program. The storage medium includes a non-transitory medium.

The computer program includes computer program codes causing a computer to execute the information processing method on the information processing apparatus when the program is executed by the computer.

It should be noted that any combination of the above-described constituent elements, and expressional conversion of the present invention among a method, an apparatus, a system, a storage medium, a computer program, and the like is also effective as an aspect of the present invention.

Various constituent elements of the present invention are not necessarily required to be individually independent elements. For example, a plurality of constituent elements may be configured as a single member, a single constituent element may be configured with a plurality of members, any constituent element may be a part of another constituent element, and a part of any constituent element may overlap a part of another constituent element.

A plurality of procedures are sequentially described in the method and the computer program of the present invention, but the order of description does not limit an order of executing the plurality of procedures. Thus, in a case where the method and the computer program of the present invention are executed, the order of the plurality of procedures may be changed within the scope without contradiction to contents thereof.

The plurality of procedures of the method and the computer program of the present invention are not limited to being individually executed at timings different from one another. Thus, any procedure may occur during execution of another procedure, and an execution timing of any procedure may partially or entirely overlap an execution timing of another procedure.

Advantageous Effects of Invention

According to each of the aspects, it is possible to provide an information processing apparatus, an information processing method, and a program capable of performing data grouping with high accuracy.

BRIEF DESCRIPTION OF THE DRAWINGS

The above-described object, and other objects, features, and advantages will become apparent throughout preferable example embodiments described below and the accompanying drawings.

DESCRIPTION OF EMBODIMENTS

Figure 1:
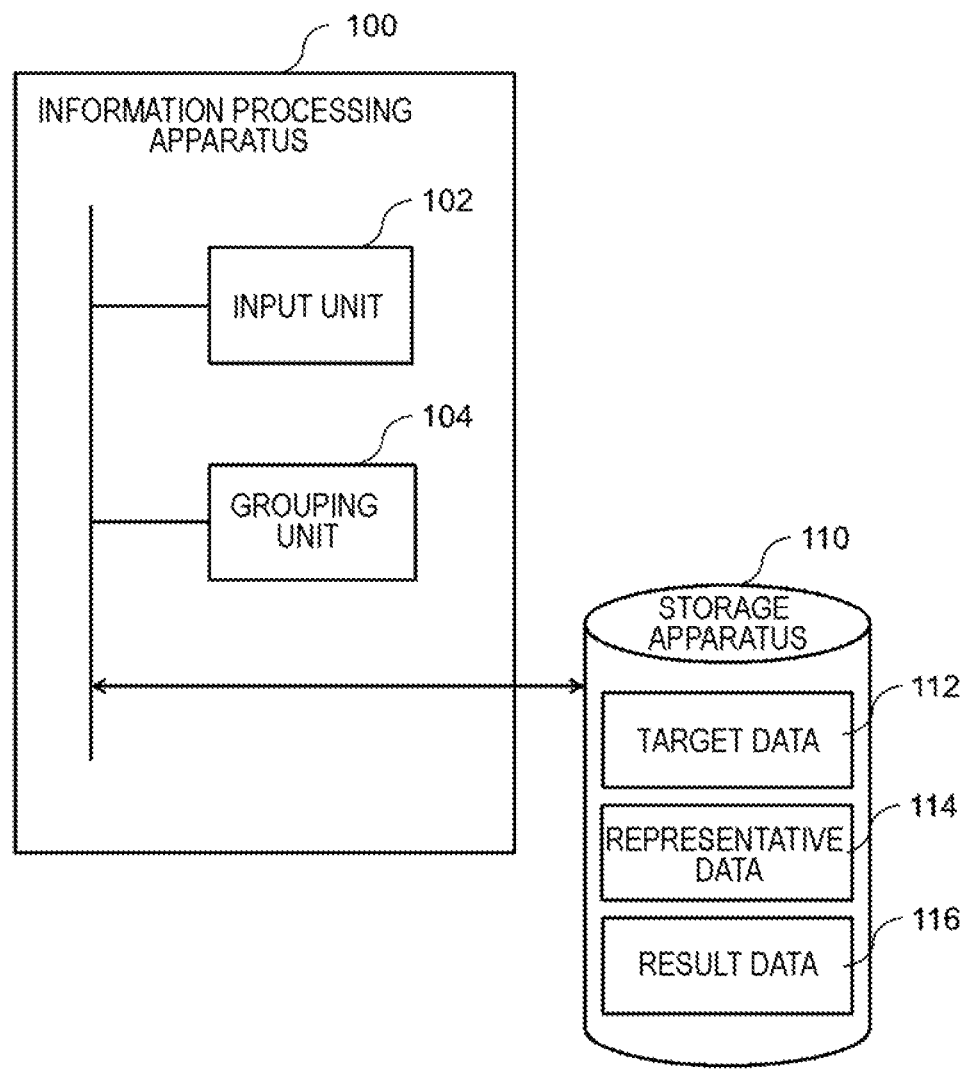
FIG. 1 is a functional block diagram illustrating a logical configuration of an information processing apparatus according to an example embodiment of the present invention.

Hereinafter, example embodiments of the present invention will be described with reference to the drawings. The same constituent elements are given the same reference numerals throughout all the drawings, and description thereof will not be repeated as appropriate.

First Example Embodiment

Hereinafter, a description will be made of a first example embodiment of the present invention.

FIG. 1 is a functional block diagram illustrating a logical configuration of an information processing apparatus 100 according to an example embodiment of the present invention.

The information processing apparatus 100 of the present example embodiment includes an input unit 102 and a grouping unit 104.

Figure 2:
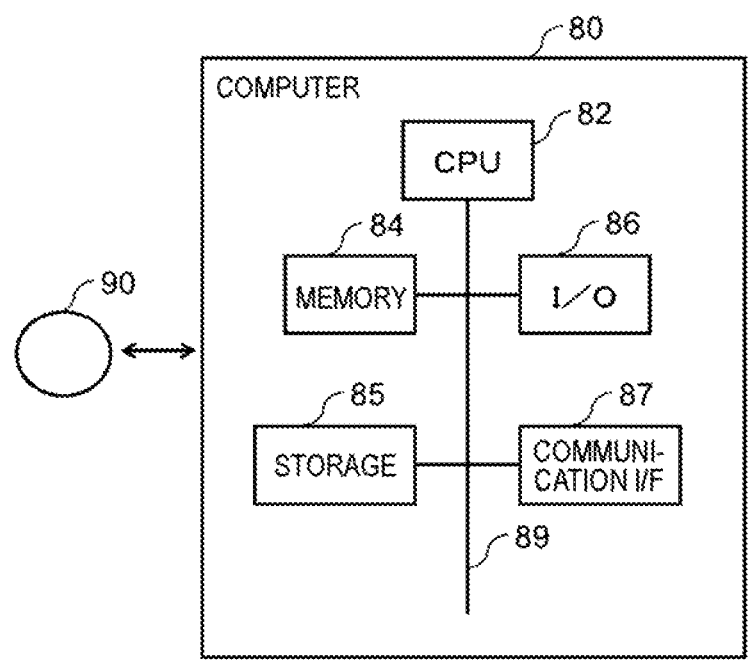
FIG. 2 is a diagram illustrating an example of a configuration of a computer realizing the information processing apparatus of the present example embodiment.

The information processing apparatus 100 is realized by a computer 80 illustrated in FIG. 2.

FIG. 2 is a diagram illustrating an example of a configuration of the computer 80 realizing the information processing apparatus 100 of the present example embodiment.

The computer 80 includes a central processing unit (CPU) 82, a memory 84, a program 90, loaded to the memory 84, for realizing the constituent elements in FIG. 1, a storage 85 storing the program 90, an input/output (I/O) 86, and a network connection interface (communication I/F 87).

The CPU 82, the memory 84, the storage 85, the I/O 86, and the communication I/F 87 are connected to each other through a bus 89, and the entire information processing apparatus 100 is controlled by the CPU 82. However, a method of connecting the CPU 82 and the like to each other is not limited to bus connection.

The memory 84 is a memory such as a random access memory (RAM) or a read only memory (ROM). The storage 85 is a storage apparatus such as a hard disk, a solid state drive (SSD), or a memory card.

The storage 85 may be a memory such as a RAM or a ROM. The storage 85 may be provided in the computer 80, may be provided outside the computer 80 and be connected to the computer 80 in a wired or wireless manner as long as the computer 80 can assess the storage. Alternatively, the storage may be provided to be attachable to and detachable from the computer 80.

The CPU 82 reads the program 90 stored in the storage 85 to the memory 84 and executes the program, and can thus realize the function of each unit of the information processing apparatus 100 in FIG. 1.

The I/O 86 controls input and output of data and a control signal among the computer 80 and other input and output apparatuses. The other input and output apparatuses include, for example, input devices (not illustrated) such as a keyboard, a touch panel, a mouse, and a microphone connected to the computer 80, output apparatuses such as a display, a printer, and a speaker, and an interface among the computer 80 and the input and output apparatuses. The I/O 86 may control input and output of data with respect to other reading or writing apparatuses (not illustrated) for a storage medium.

The communication I/F 87 is a network connection interface performing communication between the computer 80 and an external apparatus. The communication I/F 87 may be a network interface for connection to a cable line, and may be a network interface for connection to a radio line.

Each constituent element of the information processing apparatus 100 in FIG. 1 is realized by any combination of hardware and software of the computer 80 in FIG. 2. It is understood by a person skilled in the art that there are various modification examples in a realization method thereof and the apparatus. The functional block diagram illustrating the information processing apparatus 100 of each example embodiment described below indicates a block in the logical functional unit instead of a configuration in the hardware unit.

The information processing apparatus 100 may be configured with a plurality of computers 80, and may be realized by a virtual server. It should be noted that, in each drawing, a configuration of a portion having no relation to the essence of the present invention is omitted and is not illustrated.

Referring to FIG. 1 again, the input unit 102 inputs a first threshold value (hereinafter, also referred to as a first threshold value $\delta a$), and a second threshold value (hereinafter, also referred to as a second threshold value $\delta b$) which are threshold values related to the degree of similarity of a feature value of each of a plurality of pieces of data, the first threshold value being for regarding data as belonging to the same group and the second threshold value being smaller (lower) than the first threshold value.

The grouping unit 104 groups data by using the degree of similarity among a plurality of pieces of data, the first threshold value $\delta a$, and the second threshold value $\delta b$. Specifically, the grouping unit 104 causes data of which the degree of similarity with representative data is greater than the first threshold value $\delta a$ to be included in the same group, and selects new representative data from among pieces of data of which the degree of similarity with representative data already present is less than the second threshold value $\delta b$. Here, the new representative data is data as a representative of a group different from the group of the representative data already present.

The first threshold value $\delta a$ is a threshold value for regarding data as belonging to the same group as certain representative data, and the second threshold value $\delta b$ is a threshold value for regarding data as not belonging to the same group as that of the representative data. Alternatively, it may be said that the first threshold value $\delta a$ is a threshold value for regarding data as necessarily belonging to the same group as certain representative data, and the second threshold value $\delta b$ is a threshold value for regarding data as having a potential to belong to the same group as the representative data.

Here, the data includes a document, an image, a moving image, a voice, a sound, a waveform, a flow line, a shape (also including a stereoscopic shape), and the like. The data of the present example embodiment is data evaluated on the basis of, for example, resemblance of a feature value of the data, rather than whether or not pieces of data completely match each other when the pieces of data are grouped.

It should be noted that extraction of a feature value of data may be performed by using a well-known technique, and is not particularly limited. The information processing apparatus 100 of the present example embodiment groups data such as a document, an image, a moving image, or a voice on the basis of a feature value thereof, but may be applied to an application of summarizing the data. For example, representative data of a group classified by the grouping unit 104 may be used as a summary.

There may be various methods of inputting a threshold value to the input unit 102, and the following methods are exemplified. A plurality of following methods may be combined with each other.

(A1) The threshold value is read from a setting file or a program to be input.

(A2) A value received through a user operation using an input device (a keyboard, a mouse, a touch panel, or the like) connected to the computer 80 is input. In this case, a graphical user interface (GUI) is provided on a screen for setting a threshold value, and a user operation is received.

(A3) A value received through a communication network is input.

In the present example embodiment, the degree of similarity having a greater (higher) value indicates that pieces of data become similar to each other. In a case where the degree of similarity between certain pieces of data is greater than the first threshold value $\delta a$, the pieces of data are regarded as belonging to an identical group. On the other hand, the second threshold value $\delta b$ is smaller than the first threshold value $\delta a$, and, in a case where the degree of similarity between certain pieces of data is less than the second threshold value $\delta b$, the pieces of data are regarded as not belonging to an identical group.

In other example embodiments, the degree of deviation may be used instead of the degree of similarity. In a case where the degree of deviation is used, the degree of deviation having a smaller value indicates that pieces of data become similar to each other. In the degree of deviation, a direction of inequality sign for determination with a threshold value is reverse. In other words, in a case where the degree of deviation between certain pieces of data is less than the first threshold value, the pieces of data are regarded as belonging to an identical group. On the other hand, in a case where the second threshold value is greater than the first threshold value, and the degree of deviation between certain pieces of data is greater than the second threshold value, the pieces of data are regarded as not belonging to an identical group.

Here, a description will be made of the meaning of using the two threshold values in the present example embodiment.

Figure 3A:
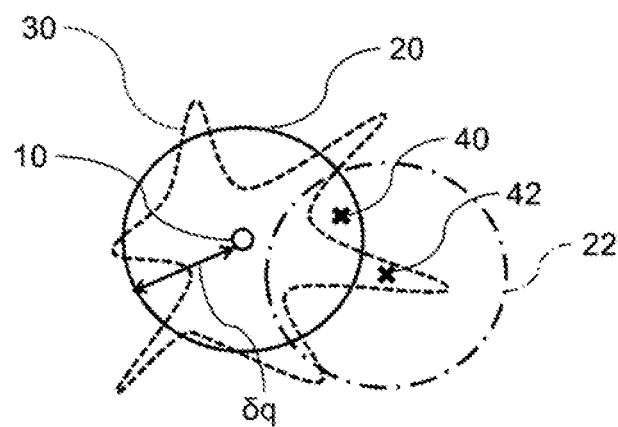
FIG. 3A to FIG. 3B are diagrams for describing a difference between a computed degree of similarity among pieces of data and resemblance of actual data.
Figure 3B:
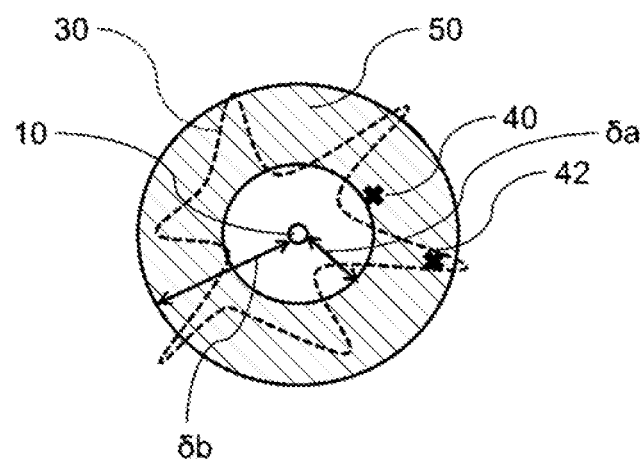

As described above, in a case where the degree of similarity includes an error, FIG. 3A illustrates an example of grouping using a single threshold value, and FIG. 3B illustrates an example of grouping using two threshold values.

As illustrated in FIG. 3A, a point located at the center indicates representative data 10 as a representative of a group, and a region 20 in a range of a similarity threshold value δq indicates data included in the group. Data other than the representative data 10 is indicated by an "x" mark. However, since the degree of similarity includes an error, a distribution 30 (indicated by a dashed line in the figure) of data to be truly included in the same group as that of the representative data 10 of the group does not necessarily match the region 20 drawn by the similarity threshold value δq.

Thus, when a certain threshold value is set, there is a case where pieces of data to be originally included in an identical group are included in different groups, or pieces of data to be included in different groups are included in an identical group.

For example, the reference numeral 20 in FIG. 3A indicates a region of a group 1, and the reference numeral 22 indicated by a dot chain line indicates a region of a group 2. Here, data is present outside the distribution 30 of the group 1, and is data to be originally included in the group 2. Data 42 is present inside the distribution 30 of the group 1, and is data to be originally included in the group 1. However, since the degree of similarity includes an error, according to grouping using the threshold value, the data 42 is present inside the region 22 of the group 2 and is thus classified into the group 2, and the data 40 is present inside the region 20 of the group 1 and is thus classified into the group 1.

Generally, in a case where a threshold value for grouping based on similarity is too great, pieces of data to be originally included in an identical group tend to be included in different groups. In a case where the threshold value is too small, pieces of data to be included in different groups tend to be included in an identical group. Depending on data, both of a case where a greater threshold value leads to a better group and a case where a smaller threshold value leads to a better group occur, and thus an essentially optimal threshold value cannot be obtained.

As mentioned above, a result occurs in which, depending on a distribution of data, pieces of data to be included in an identical group are included in different groups, or pieces of data to be included in different groups are included in an identical group, and thus there is a problem in that a desired grouping result cannot be obtained no matter how a threshold value for grouping is changed.

As illustrated in FIG. 3B, in the present invention, using two threshold values (δa and δba) allows the data 40 and the data 42 to be classified together as data included in neither the group 1 nor other groups. The data 40 and the data 42 are included in a region 50 (hatched) between the first threshold value δa and the second threshold value δb. Such data is provided to a user as not being able to be automatically determined as being included in which group.

Referring to FIG. 1, the information processing apparatus 100 is accessibly connected to a storage apparatus 110. The storage apparatus 110 is, for example, a hard disk, a solid state drive (SSD), or a memory card, and may be included in the information processing apparatus 100, and may be an external apparatus. The storage apparatus 110 may be configured with a plurality of storage apparatuses.

The storage apparatus 110 includes a target data storage unit 112, a representative data storage unit 114, and a result data storage unit 116.

The target data storage unit 112 stores data which is a target on which the information processing apparatus 100 performs a grouping process. Data itself may be stored in the target data storage unit 112, or a path name (including a file name) indicating a storage location of the data and feature value information thereof may be stored in the target data storage unit 112. The degree of similarity obtained through comparison between feature values of pieces of data may be stored in the target data storage unit 112.

The representative data storage unit 114 stores representative data selected by the grouping unit 104. Specifically, information regarding representative data of each group is stored. For example, the representative data storage unit 114 stores a file name or a path name of representative data of each group in association with an ID of the group.

The result data storage unit 116 stores result data grouped by the grouping unit 104. Specifically, representative data of each group and information regarding data included in the group are stored. For example, the result data storage unit 116 stores a file name or a path name of representative data of each group or data belonging to the group in association with an ID of the group.

The first threshold value δa and the second threshold value δb are stored in the memory 84 or the storage 85 of the computer 80, or the storage apparatus 110.

An operation of the information processing apparatus 100 of the present example embodiment having the above-described configuration will now be described.

Figure 4:
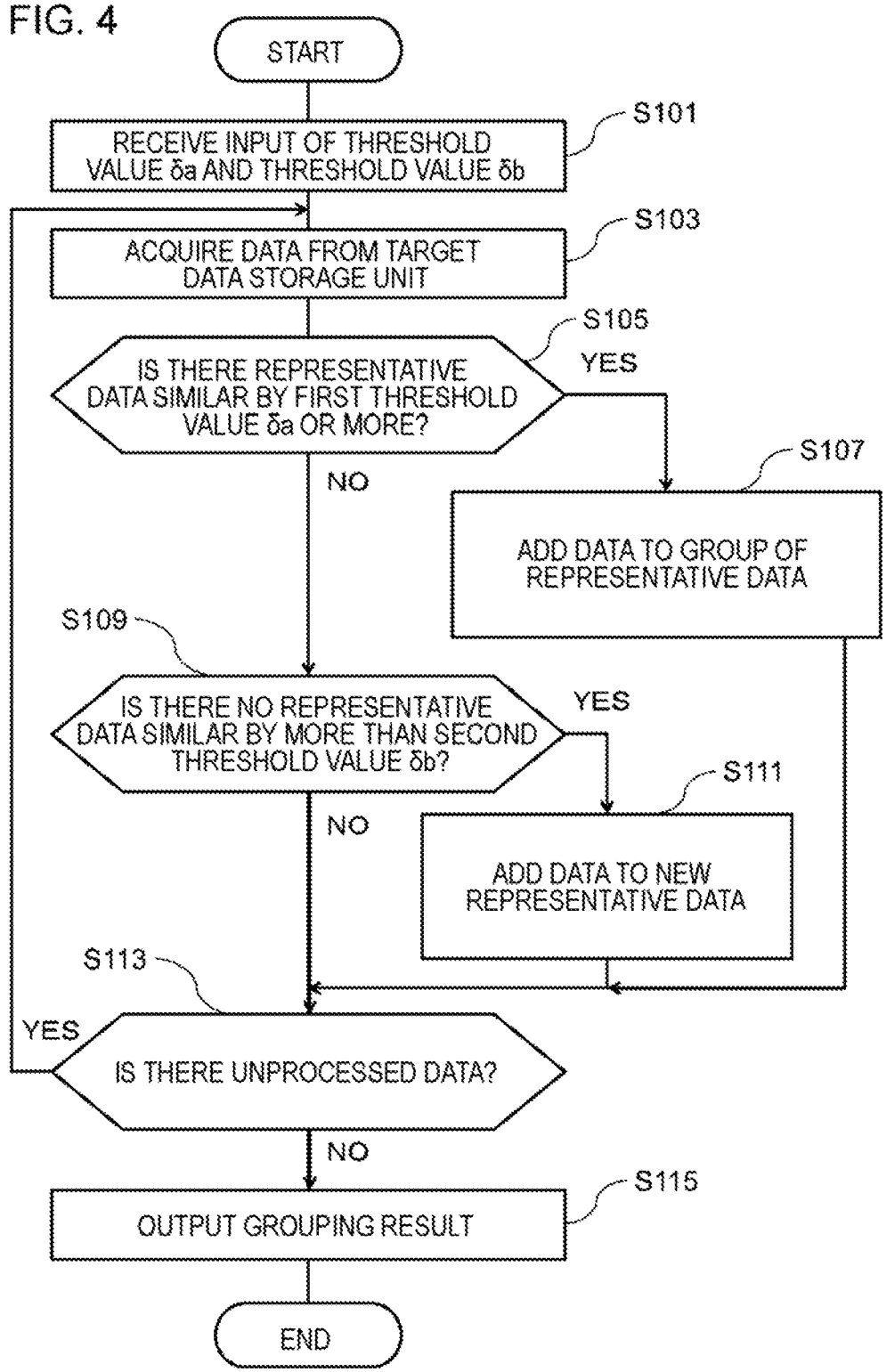
FIG. 4 is a flowchart illustrating an example of an operation of the information processing apparatus of the present example embodiment.

FIG. 4 is a flowchart illustrating an example of an operation of the information processing apparatus 100 of the present example embodiment.

The information processing apparatus 100 of the present example embodiment inputs the first threshold value δa and the second threshold value δb (step S101), and groups data by using the degree of similarity, the first threshold value δa, and the second threshold value δb. In this case, the information processing apparatus 100 causes data of which the degree of similarity with representative data is greater than the first threshold value δa (YES in step S105) to be included in the same group (step S107), and selects new representative data from among pieces of data (step S111) of which the degree of similarity with representative data already present is less than the second threshold value δb (YES in step S109). In other words, the new representative data is selected from among pieces of data of which the degree of similarity is less than the second threshold value δb. Here, a method of selecting initial representative data 10 is not particularly limited, and any data may be selected unconditionally. The selection may be performed through a user operation.

More specifically, first, the input unit 102 receives input of the first threshold value δa and the second threshold value δb (step S101). Each of the threshold values is input, for example, through a user operation using an input device of the computer 80 by using a setting screen displayed on a display apparatus (not illustrated) of the computer 80. The first threshold value δa and the second threshold value δb received by the input unit 102 are stored in the storage 85 of the computer 80.

The grouping unit 104 acquires processing target data from the target data storage unit 112 (step S103). Herein, processing target data is sequentially read one by one to be processed, but a plurality of pieces of data may be read together to be processed. As described above, in a case where information stored in the target data storage unit 112 is a feature value of data, the grouping unit 104 acquires the feature value of the data instead of the data. It should be noted that, in a case where data is read, the grouping unit 104 may also perform a process of extracting a feature value from the read data. As described above, in a case where the degree of similarity between pieces of data is stored in the target data storage unit 112, the grouping unit 104 may acquire the degree of similarity.

Here, in the present specification, the "acquisition" includes at least one of an apparatus fetching (active acquisition) data or information stored in another apparatus or a storage medium, for example, a case where the apparatus sends a request or an inquiry to another apparatus, and receives a response thereto, and a case where the apparatus accesses another apparatus or a storage medium, and reads data or information, and the apparatus inputting (passive acquisition) data or information which is output from another apparatus, for example, a case where the apparatus receives delivered data or information (alternatively, transmitted data or information, or data or information sent through push notification). The "acquisition" also includes selectively acquiring data or information from received data or information, or selectively receiving delivered data or information.

The grouping unit 104 determines to which group the data read from the target data storage unit 112 belongs, according to the following procedures. First, the grouping unit 104 computes the degree of similarity between the data and the representative data 10 on the basis of the feature values of the data and the representative data 10. It is determined whether or not the computed degree of similarity between each piece of representative data 10 and the data is equal to or greater than the first threshold value δa (step S105).

In other words, with respect to the data read from the target data storage unit 112, representative data 10 of which the degree of similarity is equal to or greater than the threshold value δa is found. In a case where there are a plurality of pieces of representative data 10, determination on the data is performed with respect to the degree of similarity with each of the pieces of representative data 10. In a case where there is the representative data 10 similar to the data read in step S103 by the first threshold value δa or more (YES in step S105), the grouping unit 104 adds the data to the group of the representative data 10, and stores result data into the result data storage unit 116 (step S107). As described above, in a case where the degree of similarity is stored in the target data storage unit 112, computation of the degree of similarity is omitted. It should be noted that, in a case where there is no representative data 10 greater than the first threshold value δa in step S105 (NO in step S105), the flow proceeds to step S109.

Next, the grouping unit 104 determines whether or not there is the representative data 10 more similar than the second threshold value δb (step S109). In other words, with respect to the data read from the target data storage unit 112, representative data 10 of which the degree of similarity is more than the threshold value δb is found. In a case where there is no representative data 10 satisfying the condition (YES in step S109), the grouping unit 104 adds the data as the new representative data 10, and stores the data into the representative data storage unit 114 (step S111). In a case where there is the representative data 10 more similar than the second threshold value δb in step S109 (NO in step S109), the flow skips step S111 and proceeds to step S113.

In a case where there is no unprocessed data (data on which the similarity determination process in step S105 and/or step S109 is not performed) (NO in step S113), the results stored in the result data storage unit 116 in step S107 and step S111 are output (step S115). In a case where there is unprocessed data (YES in step S113), the flow returns to step S103, and the processes are repeatedly performed until there is no unprocessed data, and the similarity determination process is performed on all pieces of data in the target data storage unit 112.

There may be various methods of outputting result data in step S115, and methods are exemplified as follows but are not limited thereto. A plurality of following methods may be combined with each other. The information processing apparatus 100 further includes an output unit (not illustrated) that outputs result data stored in the result data storage unit 116. The output unit is, for example, a display apparatus or a printer connected to the computer 80, or the communication I/F 87 or the I/O 86 of the computer 80.

The output unit outputs result data according to at least one of the following methods.

(B1) The result data is displayed on a screen of the display apparatus connected to the computer 80.

(B2) The result data is printed and output by the printer connected to the computer 80.

(B3) The result data is transmitted to an apparatus which is communicable with the computer 80 through a network.

(B4) A file of the result data is stored in a storage medium.

In a case where the result data is displayed on the display apparatus, for example, the output unit may schematically illustrate a tree structure in an example embodiment which will be described later to be displayed on a screen, and may display a list on the screen. A file name or a path may be displayed as a link, and the data may be accessed when the link is clicked. In a case of image data, a thumbnail may be displayed.

The output unit may separately store, for example, grouped data into a predetermined storage apparatus or a predetermined storage region (for example, a folder) for each group.

In FIG. 3B, the data 40 and the data 42 have the degree of similarity with the representative data 10, less than the first threshold value δa and greater than the second threshold value δb, and thus are not classified into any group. As mentioned above, the output unit also outputs information regarding the data which cannot be determined as being classified into which group, and thus the data can be classified into a group by separately performing an appropriate process.

In the information processing apparatus 100 of the present example embodiment, the CPU 82 executes various processing operations corresponding to the computer program 90, and thus the various units illustrated in FIG. 1 are realized as various functions.

The computer program 90 of the present example embodiment is described to cause the computer 80 realizing the information processing apparatus 100 to execute a procedure of inputting the first threshold value δa and the second threshold value δb and a procedure of grouping data by using the degree of similarity, the first threshold value δa, and the second threshold value δb, and thus to execute a procedure of causing data of which the degree of similarity with representative data is greater than the first threshold value δa to be included in the same group and a procedure of selecting new representative data from among pieces of data of which the degree of similarity with representative data already present is less than the second threshold value δb.

The computer program 90 of the present example embodiment may be recorded on a storage medium readably by the computer 80. The storage medium is not particularly limited, and various types of storage media may be used. The program 90 may be loaded to the memory 84 of the computer 80 from a storage medium, and may be downloaded to the computer 80 through a network, to be loaded to the memory 84.

A storage medium storing the computer program 90 includes a non-transitory medium which is usable by the computer 80, and program codes which are readable by the computer 80 are embedded into the medium.

As described above, according to the present example embodiment, data of which the degree of similarity is less than the second threshold value δb is determined as a separate group by the grouping unit 104, and is handled as new representative data. Thus, this increases possibility that the new representative data may indicate a target different from the representative data already selected. Consequently, a probability that different targets may be included in an identical group is reduced, and thus it is possible to prevent deterioration in accuracy of grouping.

Data of which the degree of similarity with representative data of a certain group is greater than the threshold value δa is caused to belong to the group of the representative data by the grouping unit 104. Thus, this increases a possibility that the data is the same target as the representative data. Consequently, a probability that the same targets may be included in different groups is reduced, and thus it is possible to prevent deterioration in accuracy of grouping.

Second Example Embodiment

Next, hereinafter, a description will be made of a second example embodiment of the present invention.

Figure 5:
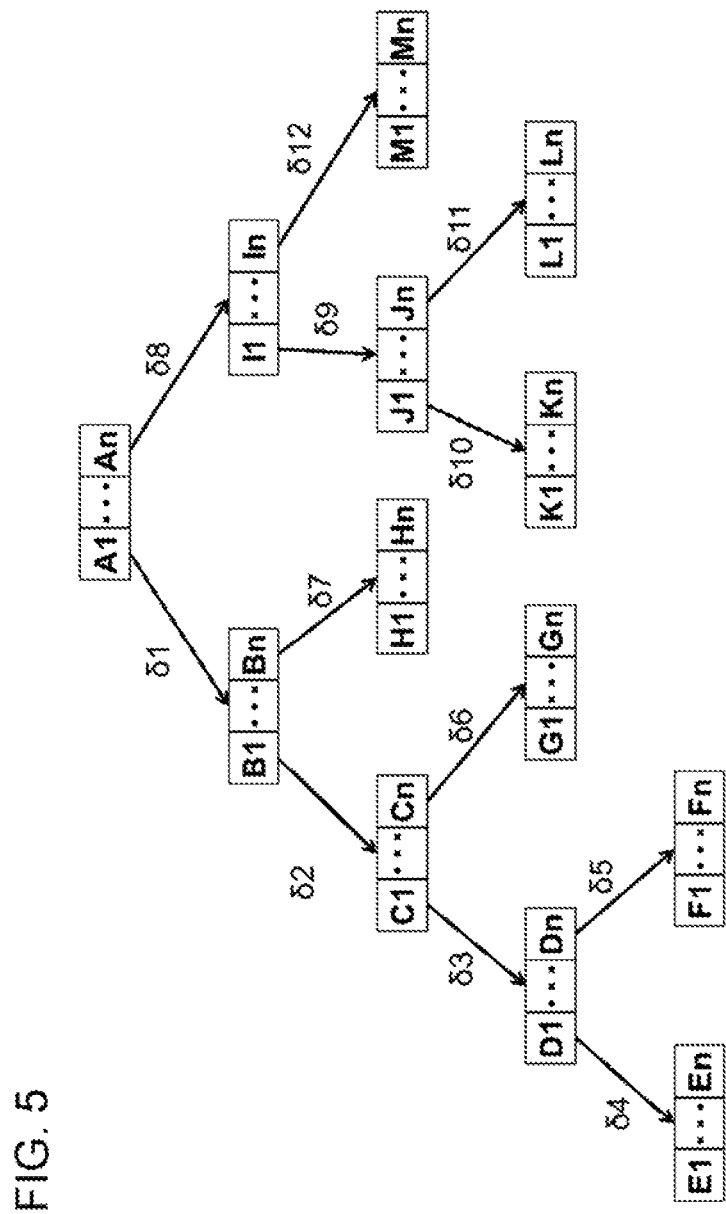
FIG. 5 is a schematic diagram illustrating an example of a data structure of processing target data stored in a target data storage unit of the information processing apparatus of the present example embodiment.

The present example embodiment is the same as the above-described example embodiment except that a data constellation which is a grouping target is already managed in a tree structure as illustrated in FIG. 5.

Figure 6:
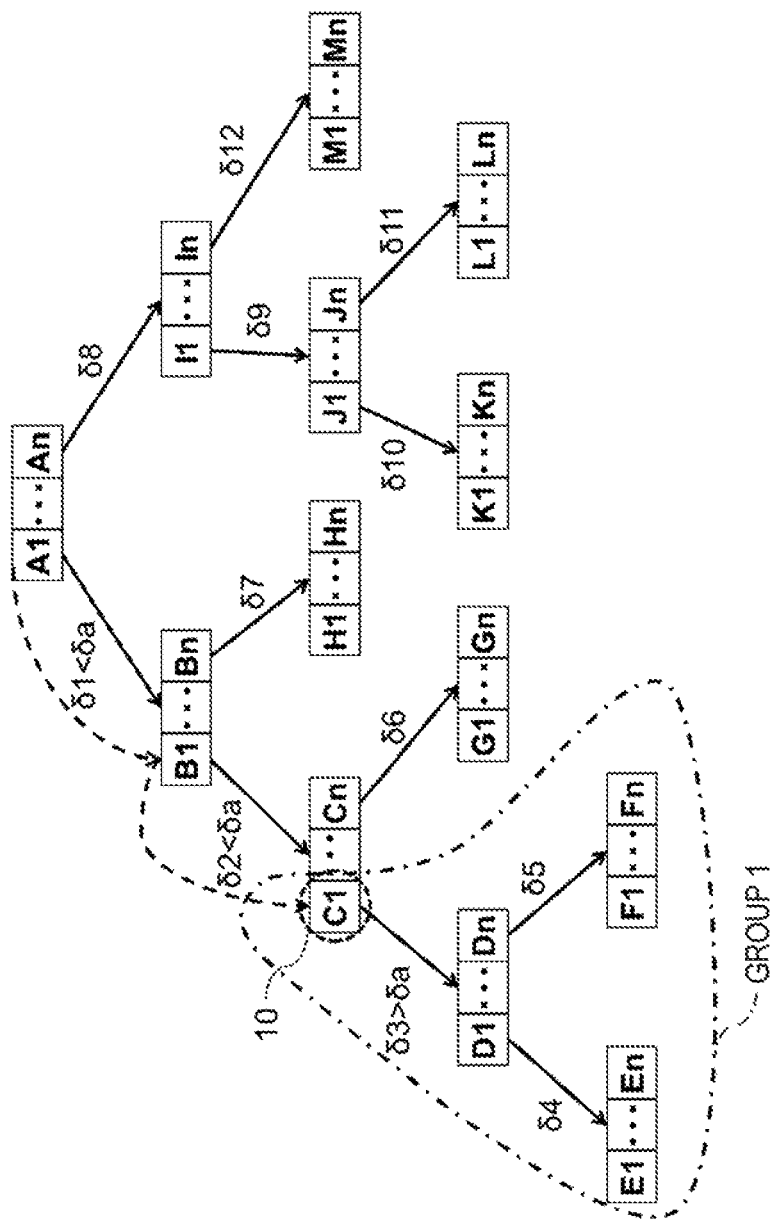
FIG. 6 is a schematic diagram illustrating an example of data structure of processing target data stored in the target data storage unit of the information processing apparatus of the present example embodiment.
Figure 7:
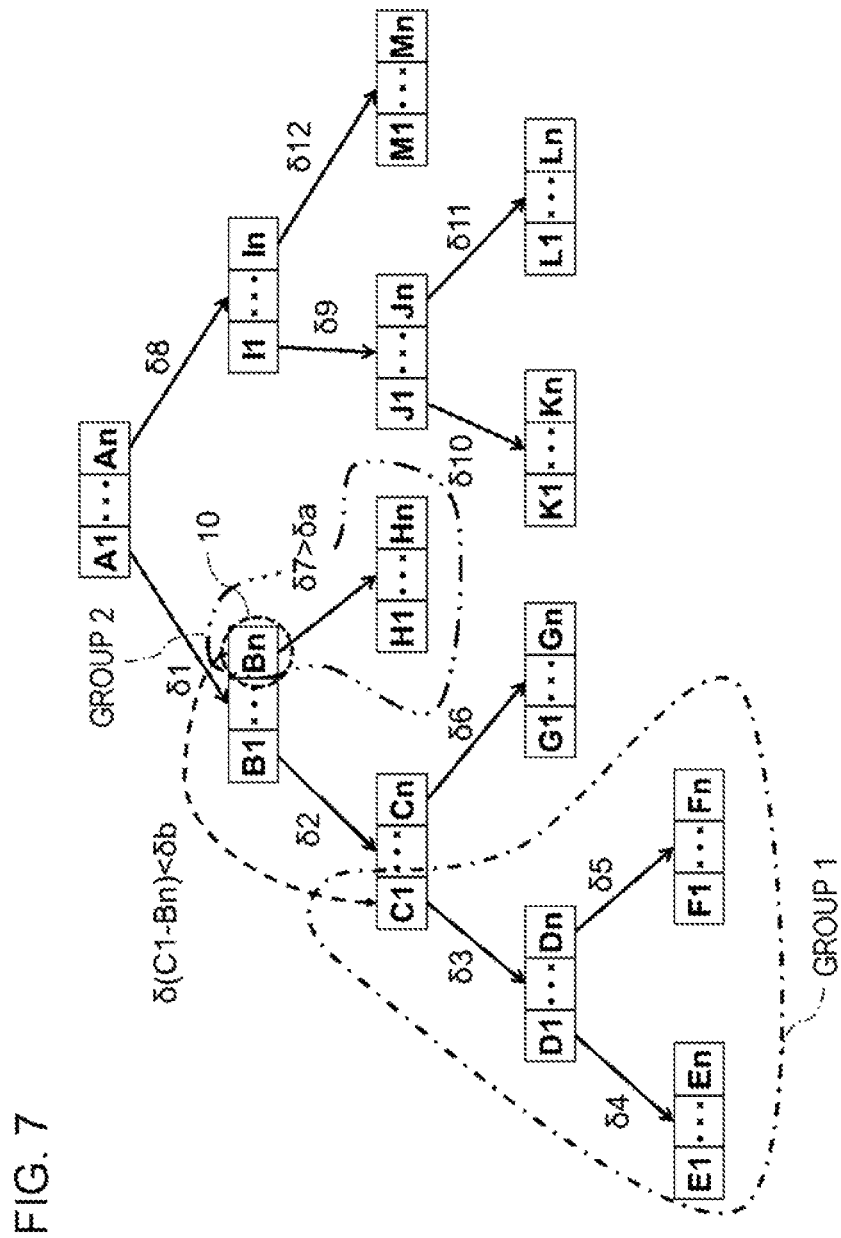
FIG. 7 is a schematic diagram illustrating an example of data structure of processing target data stored in the target data storage unit of the information processing apparatus of the present example embodiment.

FIGS. 5 to 7 are diagrams schematically illustrating examples of data structures of processing target data stored in the target data storage unit 112 of the information processing apparatus 100 of the present example embodiment.

Each node (A1, A2, . . . , Ln−1, and Ln) represents a data constellation, and a threshold value (δ1 to δ12) of the degree of similarity is setting in each link between a certain upper nodeand a lower sub-tree thereof. A certain data which has the degree of similarity between pieces of data exceeding the setting threshold value (is greater than the setting threshold value) is located below the certain upper node. These threshold values are setting to be increased in a leaf direction (lower rank) (for example, δ1<δ2<δ3<δ4).

In an initial state, the representative data storage unit 114 and the result data storage unit 116 are vacant. It is assumed that, as threshold values based on the degree of similarity, the first threshold value δa for regarding data as being included in an identical group and the second threshold value δb for regarding data as not being included in an identical group are input in advance by using the input unit 102 and are set. Here, δa≥δb.

Hereinafter, with reference to the flowchart of FIG. 4, FIGS. 5 to 7 will be described.

First, it is assumed that the input unit 102 receives input of the first threshold value δa and the second threshold value δb in advance and set the values therein (step S101). Here, it is assumed that δ3<δa<δ2. The grouping unit 104 accesses processing target data (FIG. 5) from the target data storage unit 112 (step S103).

Herein, since the representative data storage unit 114 is vacant in an initial state, there is no representative data 10 (NO in step S105 and YES in step S109), and thus the grouping unit 104 selects appropriate data as the representative data 10. This may be performed according to any method. Herein, the grouping unit 104 traces the tree in FIG. 5 in the leaf direction. A node having a link in which a threshold value (herein, δ2) set in the link is immediately greater (higher) than the first threshold value δa is selected. Herein, as described above, since δ3<δa<δ2, the nodes C1 . . . Cn (herein, C1 is selected) are selected. Data of the node C1 is selected as the representative data 10, and the data is stored into the representative data storage unit 114 (step S111).

The flow proceeds to step S113, and returns to step S103 in order to process unprocessed data, and the grouping unit 104 accesses the target data storage unit 112. Herein, as described above, δa<δ2, and δ1<δ2<δ3<δ4. Thus, in FIG. 5, the degrees of similarity between data in nodes (D1 to Dn, E1 to En, and F1 to Fn) below the node C1 and the representative data 10 (the data in the node C1) are greater than the first threshold value δa (YES in step S105). The grouping unit 104 stores the data of the nodes (D1 to Dn, E1 to En, and F1 to Fn) located at sub-trees under the node C1 in the result data storage unit 116 as the group 1 (refer to FIG. 6) (step S107).

The flow proceeds to step S113, and returns to step S103 in order to process unprocessed data, and the grouping unit 104 accesses the target data storage unit 112. In the example embodiment, data is read from the target data storage unit 112 one by one, the representative data having the degree of similarity greater than the first threshold value δa is found, and then a group in which the data is to be included is determined. In the present example embodiment, the tree is traced with the representative data 10 of a certain group as a start point, and thus a range of a node included in a group of each piece of representative data 10 is obtained.

Specifically, in FIG. 6, the grouping unit 104 traces the tree in the lower rank direction with the data of the node C1 corresponding to the representative data 10 as a start point, and adds data (YES in step S105) of which the degree of similarity with the data (representative data 10) of the node C1 is greater than the first threshold value δa to the group 1 (step S107). In other words, the nodes D1 to Dn, E1 to En, and F1 to Fn located at the lower rank of the node C1 are added to the group 1.

In FIG. 7, the grouping unit 104 traces the tree in the higher rank direction with the node C1 as a start point, and finds a node corresponding to the degree of similarity with the data (representative data 10) of the node C1 less than the second threshold value δb (step S109). If there is data of which the degree of similarity with the data (representative data 10) of the node C1 is less than the second threshold value δb (YES in step S109), the grouping unit 104 adds the data to the representative data storage unit 114 as new representative data 10 (step S111).

In FIG. 7, the degrees of similarity of data between the node C1, as a start point, and respective nodes may be obtained on the basis of threshold values of the links therebetween. For example, the degree of similarity between the node C1 and the node Bn is a value (δ(C1−Bn)) obtained by subtracting a threshold value of a link of the node Bn from a threshold value of a link of the node C1. Search for a node having this value less than the second threshold value δb is performed (step S109).

Herein, the degree of similarity (δ(C1−Bn)) between the node Bn and the node C1 is assumed to be less than the second threshold value δb (YES in step S109). Consequently, the grouping unit 104 selects data of the node Bn as the representative data 10 of a new group 2.

The grouping unit 104 traces the tree in the lower rank direction with the node Bn as a start point, and, in a case where there is data of which the degree of similarity with the new representative data 10 (the data of the node Bn) is greater than the first threshold value δa (YES in step S105), the data is added to the group 2 (step S107). Herein, in the same manner as described above, the tree is traced in the lower rank direction with the node Bn as a start point, and, data of which the degree of similarity with the data of the node Bn (representative data 10) is greater than the first threshold value δa (YES in step S105) is added to the group 2 (step S107). In other words, data of nodes H1 to Hn located at the lower rank of the node Bn is added to the group 2.

The above-described procedures are repeatedly executed until there is no unprocessed data. In a case where all pieces of data in the tree is scanned, and there is no unprocessed data (NO in step S113), the grouping unit 104 returns results (step S115). For example, as described above, result data is displayed on the display apparatus of the computer 80 or is printed and output by the printer.

As described above, the information processing apparatus 100 of the present example embodiment achieves the same effect as in the above-described example embodiment, manages data in a tree structure in the target data storage unit 112, and sets a threshold value for the degree of similarity in each link between a certain upper node and a lower sub-tree thereof, and can thus simplify a comparison process using the first threshold value δa and the second threshold value δb such that a process can be performed at a high speed.

Specifically, on the basis of a threshold value of a link between nodes, set in the tree, the tree is traced in the lower rank direction with the representative data 10 as a start point, a node corresponding to a threshold value greater than the first threshold value δa is added to a group of the representative data 10. On the other hand, the tree is traced in the higher rank direction with the representative data 10 as a start point, for each node, the node having the degree of similarity with the representative data 10, computed by using the threshold values of the links, which is less than the second threshold value δb is added to new representative data 10, and the process is repeatedly performed. As mentioned above, it is possible to group data by using a tree.

In a method of selecting the representative data 10, in the present example embodiment, since a tree is traced, the respective links are searched for a node having a threshold value of the link is greater than the first threshold value δa, and the representative data 10 can be selected, accuracy and efficiency are higher than in a case where any representative data 10 is arbitrary selected.

Third Example Embodiment

Next, a description will be made of a third example embodiment of the present invention.

In the present example embodiment, a description will be made of a method of processing data not included in any group in the grouping process in the above-described example embodiments. In other words, a description will be made of a method of processing data located between the first threshold value δa and the second threshold value δb.

Data processing methods are exemplified as follows, but are not limited thereto.

(C1) Data not included in any group through grouping is discarded.

(C2) Grouping is performed on the basis of a relative relationship with a group.

(C3) Switching between discarding and grouping is performed depending on a ratio of data.

Hereinafter, the methods will be described in order.

<C1: Data Discarding>

The grouping unit 104 may discard data not included in any group through grouping.

This method is an effective method in a case where there is a large amount of data such as feature values of a face captured in a video as data, and an identical determination is difficult due to an angle of the captured face or a light condition. In other words, data causing the quality of a grouping result to deteriorate is positively discarded, and thus it is possible to improve the quality of the grouping result.

The data not included in any group is data of which the degree of similarity with the representative data 10 of each of all groups is less than the second threshold value.

The data may be automatically discarded, and may be discarded by providing data that may be discarded to a user before discarding the data and then receiving an operation for a discarding instruction from the user. Selection of data to be discarded among pieces of data that may be disregarded may be received through a user operation, and the selected data may be discarded. Specifically, data is deleted from the target data storage unit 112 or a data storage location, or data is moved to another storage location.

<C2: Grouping Based on Relative Relationship>

The grouping unit 104 causes data of which the degree of similarity with the representative data 10 of a certain group among a plurality of groups is between the first threshold value δa and the second threshold value δb and the degree of similarity with the representative data 10 of the groups other than the certain group is less than the second threshold value, to be included in the certain group. In other words, regarding such data, a group in which the data is to be included is selected on the basis of comparison of the degree of similarity for each of a plurality of groups.

For example, in a case of certain data of which the degree of similarity with the representative data 10 of a group X which is greater than the second threshold value δb and the degree of similarity with the representative data 10 of each of all remaining groups is less than the second threshold value δb, the grouping unit 104 adds the data to the group X. In other words, since the degree of similarity is less than the first threshold value δa but is greater than the second threshold value δb, the data may be included in the group. For example, in a case where the number of pieces of data is not sufficient, it is possible to resultantly reduce the number of pieces of discarded data.

<C3: Switching Between Discarding and Adding>

The methods in (C1) and (C2) are switched according to a ratio of data not included in any group to all data. For example, in a case where a ratio of discarded data to all data is less than a predetermined value, the method in (C1) is executed, and, in a case where the ratio is greater than the predetermined value, the method in (C2) is executed. The predetermined value may be set as appropriate according to the type of data or the total number of pieces of data.

Figure 8:
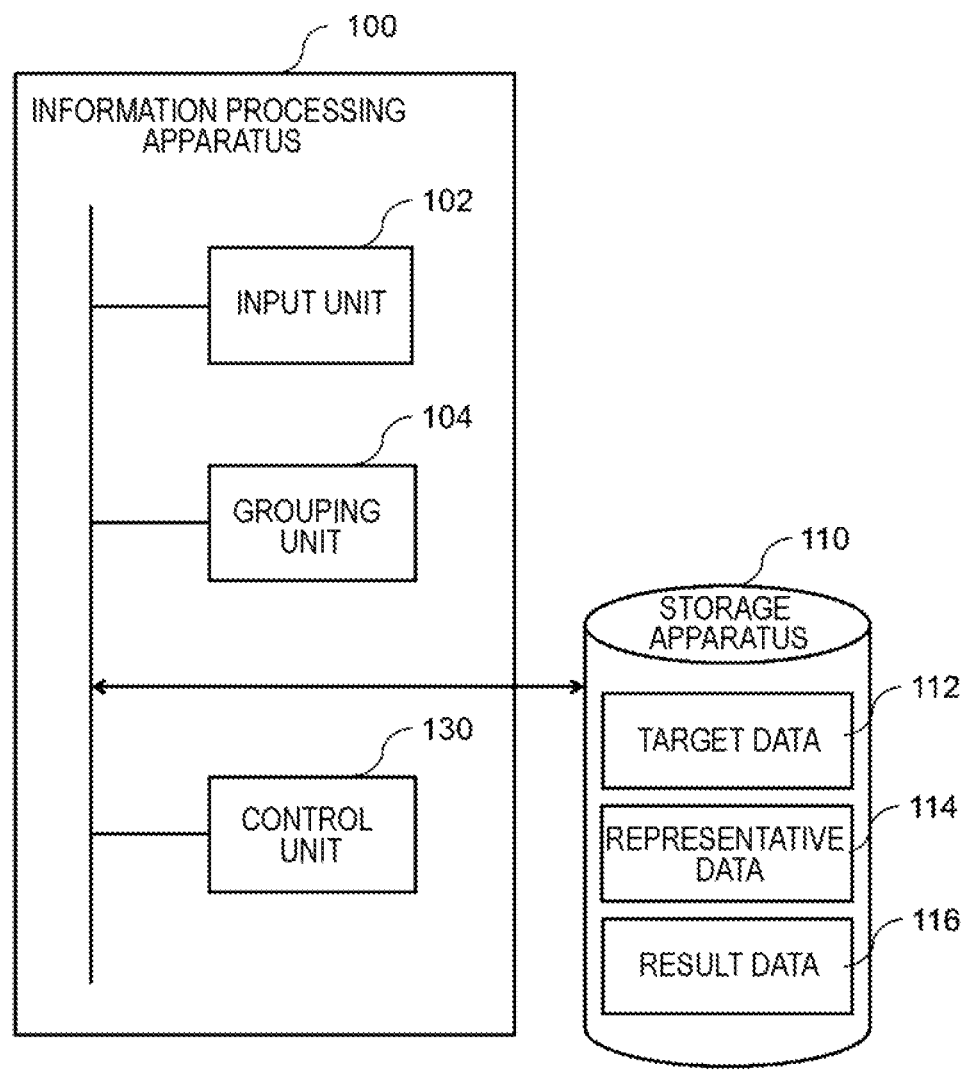
FIG. 8 is a functional block diagram illustrating a logical configuration of the information processing apparatus of the present example embodiment.

FIG. 8 is a functional block diagram illustrating a logical configuration of the information processing apparatus 100 of the present example embodiment.

The information processing apparatus 100 further includes a control unit 130 which determines which one of the method in (C1) and the method in (C2) is executed and causes the grouping unit 104 to execute the selected method, according to a ratio of data not included in any group to all data.

The control unit 130 causes data of which the degree of similarity with the representative data 10 of a certain group among a plurality of groups is between the first threshold value δa and the second threshold value δb and the degree of similarity with the representative data 10 of each of the groups other than the certain group is less than the second threshold value δb, to be included in the certain group in a case where a ratio of data not included in any group to all data is equal to or greater than a predetermined value (C2), and discards the data not included in any group in a case where the ratio is less than the predetermined value (C1).

Regarding data not included in any group through grouping, in a case where the degree of similarity with the representative data 10 of a certain group is greater than the second threshold value δb, the data may be included in the group. This process may be automatically performed, and selection of the data to be included in the group may be received from a user.

The output unit outputs an amount of data not included in any group or a ratio of the data not included in any group to all data. An amount of data is, for example, the number of pieces of data or a data size.

As described above, the information processing apparatus 100 of the present example embodiment achieves the same effect as in the above-described example embodiment, and, in a case where there is data not included in any group, can improve accuracy of data in each group by appropriately processing the data.

In other words, according to the present example embodiment, it is possible to adjust only data of which determination on grouping is difficult. Such data may be extracted as data located between the first threshold value δa and the second threshold value δb. Thus, it is possible to employ a configuration in which a group in which only such data is to be included is determined on the basis of a relative relationship of the adjusted group instead of an absolute relationship of whether or not a threshold value is exceeded.

Fourth Example Embodiment

Next, hereinafter, a fourth example embodiment of the present invention will be described.

The present example embodiment is different from the above-described example embodiments in terms of employing a configuration in which accuracy of data in a group is improved by further adjusting a threshold value. It is difficult to specify the first threshold value δa and the second threshold value δb to appropriate values from the beginning, and thus appropriate values are set, and then the threshold values are adjusted. The present example embodiment may be combined with at least one of the other example embodiments.

In the present example embodiment, a threshold value is reset on the basis of feedback from a user by using a grouping result.

Adjustment methods are exemplified as follows, but are not limited thereto. A plurality of methods may be combined with each other within the scope not causing contradiction.

(D1) The first threshold value δa is adjusted by excluding inappropriate data from a certain group.

(D2) A plurality of groups regarded as being the same are selected and coupled to each other, and the second threshold value δb is adjusted in accordance therewith.

(D3) A threshold value is set for each group.

Hereinafter, the methods will be described in order.

<D1: Data Exclusion and Resultant Adjustment of First Threshold Value δa>

Figure 9:
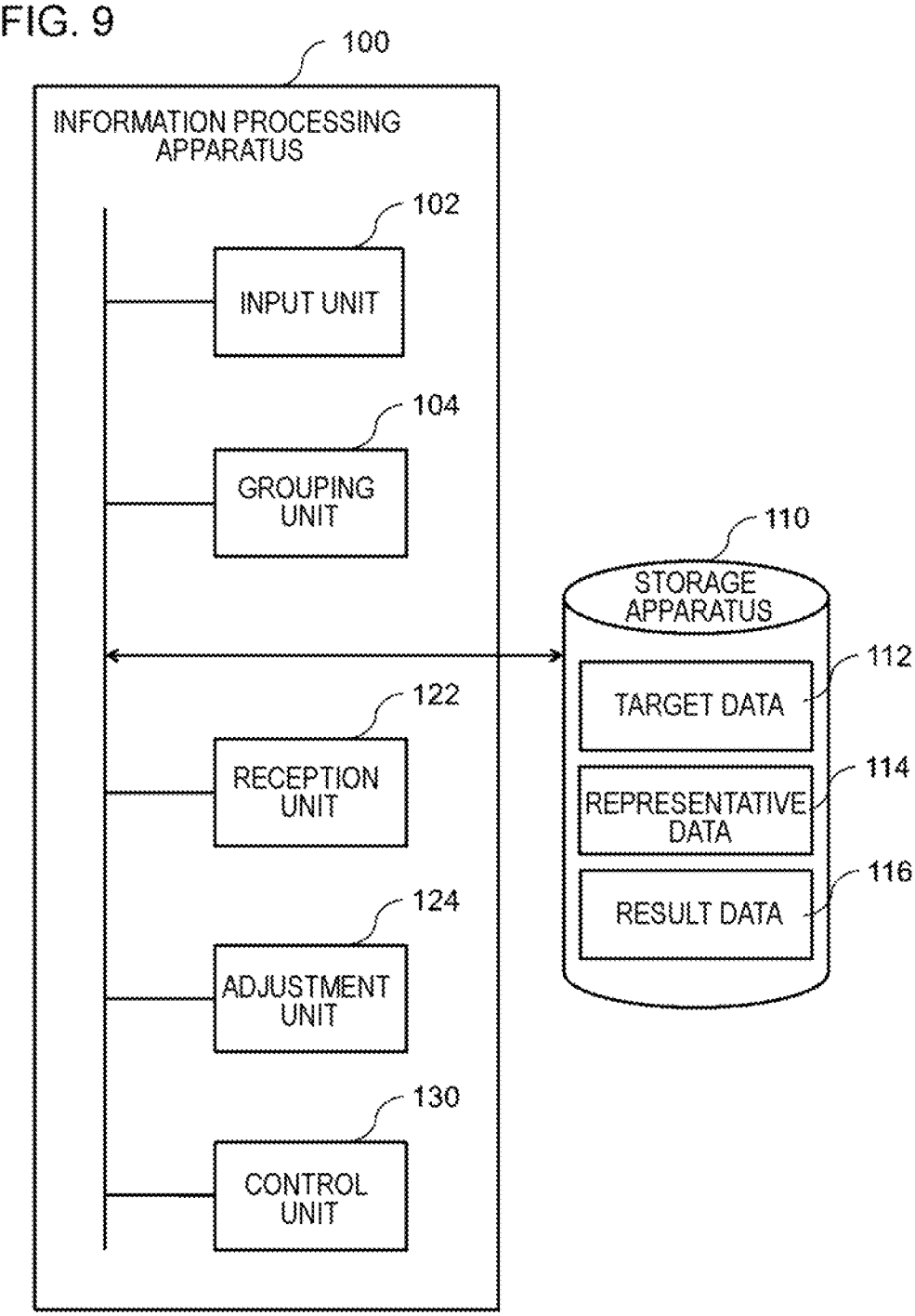
FIG. 9 is a functional block diagram illustrating a logical configuration of the information processing apparatus of the present example embodiment.

FIG. 9 is a functional block diagram of a logical configuration of an information processing apparatus 100 according to the example embodiment of the present invention.

The information processing apparatus 100 includes an input unit 102, a grouping unit 104, a reception unit 122, an adjustment unit 124, and a control unit 130. The input unit 102 and the grouping unit 104 are the same as those in the example embodiment illustrated in FIG. 1 or 8. The control unit 130 is the same as that in the example embodiment illustrated in FIG. 8.

The reception unit 122 outputs a grouped result, and receives an operation of excluding at least one piece of data from a certain group. There may be various methods of outputting a grouped result as described above, but, herein, it is assumed that the grouping result is displayed on a display apparatus connected to the computer 80. For example, a tree structure as in FIG. 7 and a group name are schematically illustrated to be displayed on a screen, and a list of data of each group may be displayed on the screen. A file name or a path may be displayed as a link, and the data may be accessed when the link is clicked. In a case of image data, a thumbnail may be displayed. The reception unit 122 displays the grouped result on the display apparatus of the computer 80, and receives at least one piece of exclusion target data selected through a user operation using an operation unit (not illustrated) of the computer 80.

There may be a configuration in which pieces of data selected as exclusion targets by a user are arranged and provided to be compared with the representative data 10, a message for asking the user whether or not to really exclude the data is displayed, and a confirmation or cancellation operation is received from the user. Data to be excluded from a group may be selected, and selection of data not excluded from a group may be received through a user operation.

The adjustment unit 124 adjusts the first threshold value δa on the basis of the degree of similarity between excluded data and the representative data 10 of a first group including the data. The grouping unit 104 excludes the exclusion target data received by the reception unit 122 from the group. It should be noted that the grouping unit 104 may perform regrouping process on all processing target data by using the first threshold value δa adjusted by the adjustment unit 124.

Figure 10A:
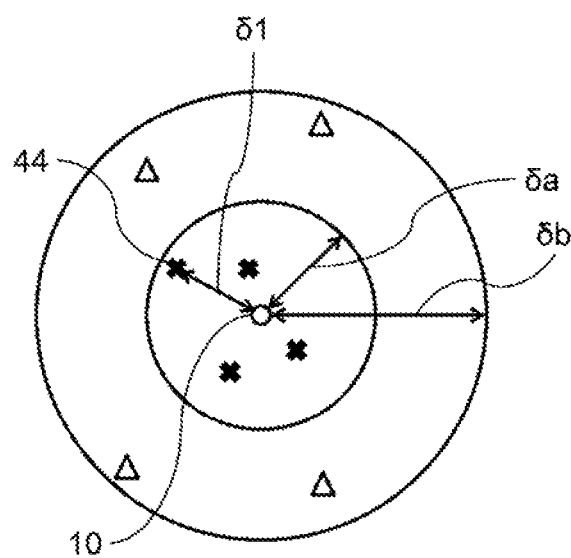
FIG. 10A to FIG. 10B are diagrams for describing a process of adjusting a threshold value by excluding data from a group.
Figure 10B:
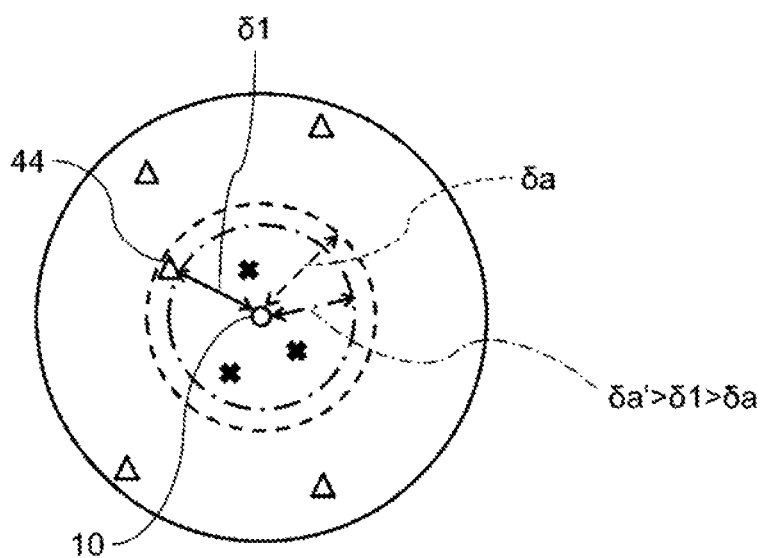

The adjustment unit 124 changes the first threshold value δa to a value greater than the degree of similarity between excluded data and the representative data 10. FIG. 10A schematically illustrates a data distribution of the group 1 before exclusion. A circle indicates the representative data 10, X indicates data of the group 1, and a triangle indicates data outside the group 1. FIG. 10B schematically illustrates a data distribution of the group 1 when data 44 is excluded through a user operation. In a case where the degree of similarity between the representative data 10 and the data 44 is δ1, the first threshold value δa before being adjusted is smaller than δ1.

Here, in a case where the data 44 is excluded from the group 1, the adjustment unit 124 adjusts the first threshold value δa so that a first threshold value δa' is greater than δ1.

In FIG. 10B, the first threshold value δa before being adjusted is indicated by a dashed line, and the first threshold value δa' after being adjusted is indicated by a dot chain line.

In a case where a plurality of pieces of data are excluded, adjustment methods in the adjustment unit 124 are exemplified as follows, but are not limited thereto.

(E1) A value obtained by adding a predetermined value to a highest degree of similarity among degrees of similarity between a plurality of respective pieces of excluded data and the representative data 10 is used.

(E2) A value obtained by adding a predetermined value to an average value of degrees of similarity between a plurality of respective pieces of excluded data and the representative data 10 is used.

(E3) Among a plurality of pieces of excluded data, pieces of data of which the degree of similarity with the representative data 10 is highest and lowest are excluded, and the first threshold value is adjusted according to (E1) or (E2).

The reception unit 122 may receive an operation of adding data not included in any group to a certain group. In this case, the adjustment unit 124 may adjust the first threshold value δa to a value less than the degree of similarity between the added data and the representative data 10. In this case, each threshold value is adjusted such that the second threshold value δb is smaller than the first threshold value δa.

The grouping unit 104 may perform regrouping on all processing target data by using the threshold value adjusted by the adjustment unit 124.

<D2: Group Coupling and Resultant Adjustment of Second Threshold Value δb>

The reception unit 122 outputs a grouped result, and receives an operation of selecting a plurality of groups regarded as belonging to an identical group.

Then, the grouping unit 104 integrates the plurality of groups received by the reception unit 122 into a single group. The adjustment unit 124 adjusts the second threshold value δb on the basis of the degree of similarity between the pieces of representative data 10 of the plurality of selected groups. Specifically, the adjustment unit 124 adjusts the second threshold value δb to a value less than the degree of similarity between the pieces of representative data 10 of the plurality of groups received by the reception unit 122. The adjustment unit 124 may further adjust the first threshold value δa.

The grouping unit 104 may perform regrouping process on all processing target data by using the threshold value adjusted by the adjustment unit 124.

Figure 11A:
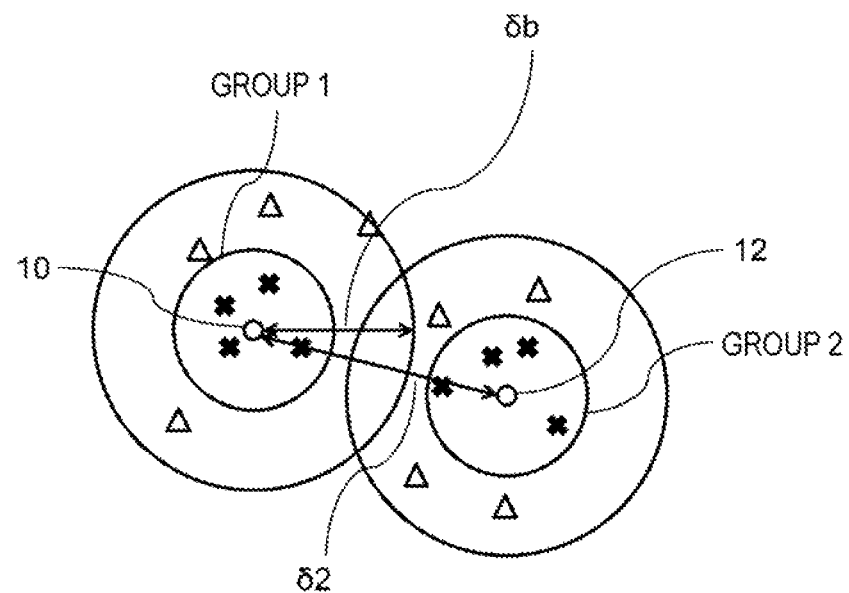
FIG. 11A to FIG. 11B are diagrams for describing a process of adjusting a threshold value by combining a plurality of groups into one group.
Figure 11B:
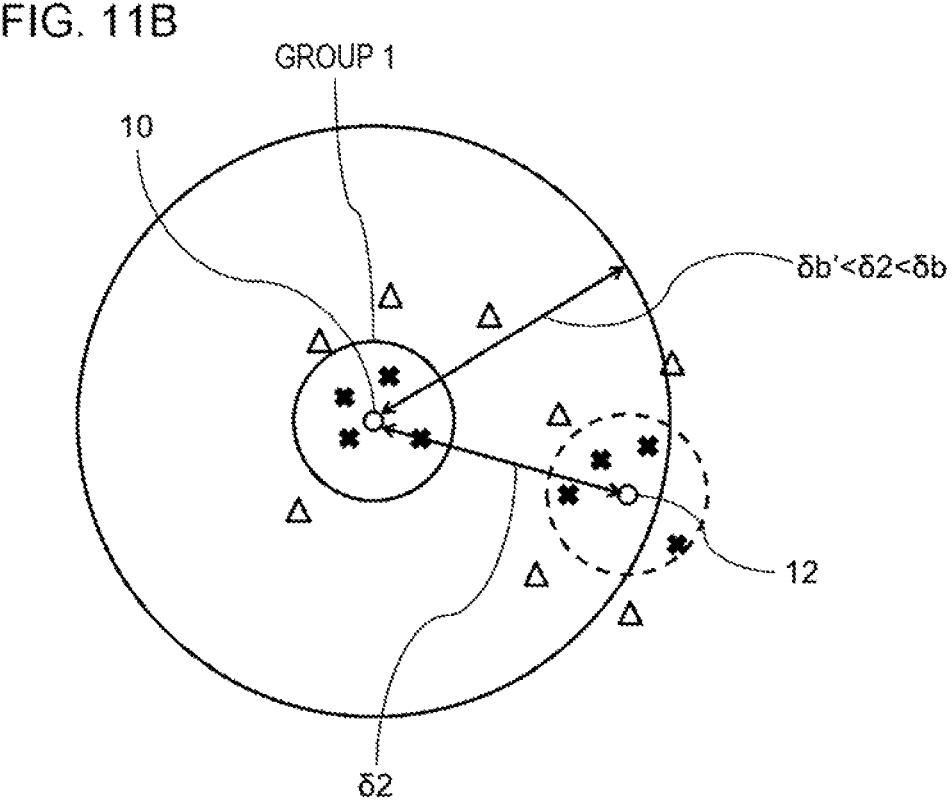

A description will be made of a case of coupling two groups such as the group 1 and the group 2 into an identical group with reference to FIG. 11A and FIG. 11B. FIG. 11A illustrates a data distribution before coupling. It is assumed that the degree of similarity between the representative data 10 of the group 1 and representative data 12 of the group 2 is 62.

The adjustment unit 124 adjusts the second threshold value δb of the group 1 to a value δb' less than the degree of similarity δ2. As illustrated in FIG. 11B, data which is the representative data 12 of the group 2 is included in a range of the second threshold value δb of the group 1.

Herein, an example of adjusting the second threshold value δb is described, but the first threshold value δa may be adjusted. In other words, the first threshold value δa may be adjusted to a value less than the degree of similarity δ2. Which one of the first threshold value δa and the second threshold value δb is adjusted may be selected by a user, and may be set in advance.

<D3: Setting for Each Group>

The reception unit 122 outputs a grouped result, and receives an operation of selecting a changing target group and an operation of changing the first threshold value δa or the second threshold value δb of each selected group. The reception unit 122 stores a received threshold value into the memory 84 or the storage 85 of the computer 80, or the storage apparatus 110 for each group.

The adjustment unit 124 changes the first threshold value δa or the second threshold value δb of a selected group in accordance with a user operation. The grouping unit 104 performs grouping by using the first threshold value δa and the second threshold value δb changed by the adjustment unit 124.

In the methods in (D1) and (D2), grouping is performed by using an identical threshold value for all groups, but, in the method in (D3), different threshold values are set in respective groups. Herein, a method of separately setting a threshold value through a user operation is described, but a threshold value set according to the methods in (D1) and (D2) may be configured to be used in each group. In other words, the adjustment unit 124 may store the threshold value set according to the methods in (D1) and (D2) into the memory 84 or the storage 85 of the computer 80, or the storage apparatus 110 for each group, and the grouping unit 104 may perform grouping by using the threshold value set in each group.

The grouping unit 104 may perform regrouping process on all processing target data by using the threshold value adjusted by the adjustment unit 124.

As described above, the information processing apparatus 100 of the present example embodiment achieves the same effect as in the above-described example embodiment, and can improve accuracy of data in each group by adjusting a threshold value to an appropriate value. Two threshold values such as the first threshold value δa for regarding data as necessarily belonging to a group and the second threshold value δb for regarding data having a potential to belong to a group can be separately adjusted, and thus it is possible to improve the quality of a grouping result.

As mentioned above, the example embodiments of the present invention have been described with reference to the drawings, but these are examples of the present invention, and various configurations other than the above-described configurations may be employed.

For example, in the example embodiment, a description has been made of an example of using two threshold values such as the first threshold value δa and the second threshold value δb, but, for example, a reference threshold value δ0 and a width d from the reference threshold value δ0 may be used. The reference threshold value δ0 may be any one of an upper limit, a median, and a lower limit. In other words, a boundary between the inside of a group and the outside of the group may be indicated by a strip shape having a predetermined width instead of a line.

In other example embodiments, in a case where new data is added after grouping is performed, a user operation of replacing the representative data 10 with another piece of data may be received. For example, in a case where a tree structure of a processing target data constellation is changed, the representative data 10 may be selected, and regrouping may be performed, on the basis of a threshold value between newly set links.

As mentioned above, the present invention has been described with reference to the example embodiments and the examples, but the present invention is not limited to the example embodiments and examples. The configuration or details of the present invention may be subjected to various changes which can be understood by a person skilled in the art within the scope of the present invention.

It should be noted that acquisition and use of information regarding a user in the present invention are assumed to be performed legally.

The invention claimed is:

1. An information processing method executed by an information processing apparatus, the method comprising:
    inputting a first threshold value and a second threshold value related to a degree of similarity of a feature value of each of a plurality of pieces of data, the first threshold value being for regarding data as belonging to an identical group, and the second threshold value being smaller than the first threshold value;
    grouping the data by using the degree of similarity, the first threshold value, and the second threshold value; and
    outputting a result of the grouping of the data,
    wherein the grouping comprises:
    initially selecting first representative data as representative of a first group from among any of the data;
    causing the data of which the degree of similarity with the representative data is greater than the first threshold value to be included in the first group; and
    further selecting second representative data as representative of a second group different from the first group, the degree of similarity of the second representative data with the first representative data being less than the second threshold value,
    wherein the method further comprises:
    determining, according to a ratio of the data not belonging to any group to all of the data, which processes are to be performed, and performing the determined processes, the processes including a process of including, into a certain group, data of which the degree of similarity with third representative data of the certain group among the plurality of groups is between the first threshold value and the second threshold value and the degree of similarity with fourth representative data of each of the groups other than the certain group is less than the second threshold value, and a process of discarding the data not belonging to any group;
    performing the grouping such that the data of which the degree of similarity with the third representative data of the certain group among the plurality of groups is between the first threshold value and the second threshold value and the degree of similarity with the fourth representative data of each of the groups other than the certain group is less than the second threshold value is included in the certain group, in a case where the ratio is equal to or greater than a predetermined value; and
    discarding the data not belonging to any group in a case where the ratio is less than the predetermined value.

2. The information processing method executed by the information processing apparatus according to claim 1, the method further comprising:
    receiving an operation of excluding at least one piece of data from a certain group;
    adjusting the first threshold value based on the degree of similarity between the data to be excluded through the operation and other representative data of the certain group including the data to be excluded; and
    excluding the data received as an exclusion target through the operation from the certain group.

3. The information processing method executed by the information processing apparatus according to claim 1, the method further comprising:
    receiving an operation of selecting a plurality of the groups for being integrated into a single group;
    adjusting the second threshold value based on the degree of similarity between other representative data of the plurality of groups selected through the operation; and
    integrating the plurality of groups selected through the operation into the single group.

4. The information processing method executed by the information processing apparatus according to claim 1, the method further comprising:
    receiving an operation of selecting a change target group and an operation of changing the first threshold value or the second threshold value of the change target group;
    changing the first threshold value or the second threshold value of the change target group based on the operation; and
    performing the grouping by using the first threshold value and the second threshold value which have been changed.

5. The information processing method executed by the information processing apparatus according to claim 1, the method further comprising:
    performing the grouping such that the data of which the degree of similarity with third representative data of a certain group among the plurality of groups is between the first threshold value and the second threshold value and of which the degree of similarity with fourth representative data of each of the groups other than the certain group is less than the second threshold value is included in the certain group.

6. The information processing method executed by the information processing apparatus according to claim 1,
    wherein the information processing apparatus discards the data not belonging to any group through the grouping.

7. The information processing method executed by the information processing apparatus according to claim 1,
    wherein the information processing apparatus manages the data in a hierarchical tree structure based on the degree of similarity between the data,
    wherein, in the hierarchical tree structure, each link between a certain upper node and a lower sub-tree of the upper node has a threshold value set for the degree of similarity, and the data of which the degree of similarity is greater than the set threshold value is located at a lower rank of the upper node, and
    wherein the method further comprises :
    when the grouping is performed, tracing the hierarchical tree structure from a higher rank to the lower rank, and setting the data of a node having a link in which the set threshold value is greater than the first threshold value as the third representative data.

8. An information processing system comprising:
    a memory configured to store instructions; and
    a processor configured to execute the instructions to:
    input a first threshold value and a second threshold value related to a degree of similarity of a feature value of each of a plurality of pieces of data, the first threshold value being for regarding data as belonging to an identical group, and the second threshold value being smaller than the first threshold value;
    group the data by using the degree of similarity, the first threshold value, and the second threshold value; and
    output a result of the grouping of the data, wherein the data is grouped by:
initially selecting first representative data as representative of a first group from among any of the data;
causing the data of which the degree of similarity with the representative data is greater than the first threshold value to be included in the first group; and
further select second representative data as representative of a second group different from the first group, the degree of similarity of the second representative data with the first representative data being less than the second threshold value,
wherein the processor is configured to execute the instructions to further:
determine, according to a ratio of the data not belonging to any group to all of the data, which processes are to be performed, and performing the determined processes, the processes including a process of including, into a certain group, data of which the degree of similarity with third representative data of the certain group among the plurality of groups is between the first threshold value and the second threshold value and the degree of similarity with fourth representative data of each of the groups other than the certain group is less than the second threshold value, and a process of discarding the data not belonging to any group;
perform the grouping such that the data of which the degree of similarity with the third representative data of the certain group among the plurality of groups is between the first threshold value and the second threshold value and the degree of similarity with the fourth representative data of each of the groups other than the certain group is less than the second threshold value is included in the certain group, in a case where the ratio is equal to or greater than a predetermined value; and
discard the data not belonging to any group in a case where the ratio is less than the predetermined value.

9. The information processing system according to claim 8, wherein the processor is configured to execute the instructions to:
receive an operation of excluding at least one piece of data from a certain group;
adjust the first threshold value based on the degree of similarity between the data to be excluded through the operation and other representative data of the certain group including the data to be excluded; and
exclude the data received as an exclusion target through the operation from the certain group.

10. The information processing system according to claim 8, wherein the processor is configured to execute the instructions to:
receive an operation of selecting a plurality of the groups for being integrated into a single group;
adjust the second threshold value based on the degree of similarity between other representative data of the plurality of groups selected through the operation; and
integrate the plurality of groups selected through the operation into the single group.

11. The information processing system according to claim 8, wherein the processor is configured to execute the instructions to:
receive an operation of selecting a change target group and an operation of changing the first threshold value or the second threshold value of the change target group;
change the first threshold value or the second threshold value of the change target group based on the operation; and perform the grouping by using the first threshold value and the second threshold value which have been changed.

12. The information processing system according to claim 8, wherein the processor is configured to execute the instructions to:
perform the grouping such that the data of which the degree of similarity with third representative data of a certain group among the plurality of groups is between the first threshold value and the second threshold value and of which the degree of similarity with fourth representative data of each of the groups other than the certain group is less than the second threshold value is included in the certain group.

13. The information processing system according to claim 8, wherein the processor is configured to execute the instructions to:
discard the data not belonging to any group through the grouping.

14. The information processing system according to claim 8,
wherein the data is managed in a hierarchical tree structure based on the degree of similarity between the data,
wherein, in the hierarchical tree structure, each link between a certain upper node and a lower sub-tree of the upper node has a threshold value set for the degree of similarity, and the data of which the degree of similarity is greater than the set threshold value is located at a lower rank of the upper node, and
wherein the processor is configured to execute the instructions to:
trace the hierarchical tree structure from a higher rank to the lower rank, and set the data of a node having a link in which the set threshold value is greater than the first threshold value as third representative data.

15. A non-transitory computer readable storage medium storing a program causing a computer to execute:
inputting a first threshold value and a second threshold value related to a degree of similarity of a feature value of each of a plurality of pieces of data, the first threshold value being for regarding data as belonging to an identical group, and the second threshold value being smaller than the first threshold value;
grouping the data by using the degree of similarity, the first threshold value, and the second threshold value; and
outputting a result of the grouping of the data,
wherein the grouping comprises:
initially selecting first representative data as representative of a first group from among any of the data;
causing the data of which the degree of similarity with the representative data is greater than the first threshold value to be included in the first group; and
further selecting second representative data as representative of a second group different from the first group, the degree of similarity of the second representative data with the first representative data being less than the second threshold value,
wherein the program causes the computer to further execute:
determining, according to a ratio of the data not belongin t o any group to all of the data which processes are to be performed, and performing the determined processes, the processes including a process of including, into a certain group, data of which the degree of similarity with third representative data of the certain group among the plurality of groups is between the first threshold value and the second threshold value and the degree of similarity with fourth representative data of each of the groups other than the certain group is less than the second threshold value, and a process of discarding the data not belonging to any group;

performing the grouping such that the data of which the degree of similarity with the third representative data of the certain group among the plurality of groups is between the first threshold value and the second threshold value and the degree of similarity with the fourth representative data of each of the groups other than the certain group is less than the second threshold value is included in the certain group, in a case where the ratio is equal to or greater than a predetermined value; and discarding the data not belonging to any group in a case where the ratio is less than the predetermined value.

16. The non-transitory computer readable storage medium according to claim 15, further causing the computer to execute:

receiving an operation of excluding at least one piece of data from a certain group;

adjusting the first threshold value based on the degree of similarity between the data to be excluded through the operation and other representative data of the certain group including the data to be excluded; and excluding the data received as an exclusion target through the operation from the certain group.

17. The non-transitory computer readable storage medium according to claim 15, further causing the computer to execute:

receiving an operation of selecting a plurality of the groups for being integrated into a single group;

adjusting the second threshold value based on the degree of similarity between other representative data of the plurality of groups selected through the operation; and integrating the plurality of groups selected through the operation into the single group.

18. The non-transitory computer readable storage medium according to claim 15, further causing the computer to execute:

receiving an operation of selecting a change target group and an operation of changing the first threshold value or the second threshold value of the change target group;

changing the first threshold value or the second threshold value of the change target group based on the operation; and performing the grouping by using the first threshold value and the second threshold value which have been changed.

* * * * *